(12) United States Patent
Shepherd et al.

(10) Patent No.: US 7,944,581 B2
(45) Date of Patent: May 17, 2011

(54) IMPOSITION SYSTEMS, METHODS AND DRIVERS FOR PRINTER PRODUCTS

(75) Inventors: Michael David Shepherd, Ontario, NY (US); Lee Coy Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1096 days.

(21) Appl. No.: 11/687,025

(22) Filed: Mar. 16, 2007

(65) Prior Publication Data

US 2008/0225306 A1   Sep. 18, 2008

(51) Int. Cl.
*G06K 15/02* (2006.01)
(52) U.S. Cl. .......... 358/1.2; 358/1.1; 358/1.11; 345/471; 345/472; 345/472.1; 345/472.2; 382/176; 382/298; 382/282; 382/284
(58) Field of Classification Search .......... None
See application file for complete search history.

(56) References Cited

U.S. PATENT DOCUMENTS

| | | | | |
|---|---|---|---|---|
| 4,920,377 A * | 4/1990 | Ito et al. | ............... | 355/55 |
| 6,055,061 A * | 4/2000 | Sato | ............... | 358/1.11 |
| 7,386,790 B2 * | 6/2008 | Hino | ............... | 715/269 |
| 7,733,518 B2 * | 6/2010 | Tonegawa | ............... | 358/1.2 |
| 2002/0036788 A1* | 3/2002 | Hino | ............... | 358/1.11 |
| 2004/0146199 A1* | 7/2004 | Berkner et al. | ............... | 382/176 |
| 2006/0238807 A1* | 10/2006 | Natori | ............... | 358/1.15 |
| 2007/0052979 A1* | 3/2007 | Burlingame | ............... | 358/1.1 |
| 2007/0121163 A1* | 5/2007 | Murata et al. | ............... | 358/1.18 |

* cited by examiner

*Primary Examiner* — King Y Poon
*Assistant Examiner* — Jacky X Zheng
(74) *Attorney, Agent, or Firm* — Oliff & Berridge, PLC

(57) ABSTRACT

Imposition system and drivers for printer products prepare a document for printing by receiving an electronic document to be printed, determining a smallest font size of the text of at least a portion of the document; determining a scale factor for at least one portion of the document based on the smallest font size and a predetermined minimum font size; and scaling at least a portion of the document by the scale factor.

18 Claims, 4 Drawing Sheets

This document is printed in 18 point font size when unscaled and not numbered up.

*FIG. 5a*

| This document is printed in 18 point font size when unscaled and not numbered up. | This document is scaled. It is printed in 12 point font size and two-upped. |

*FIG. 5b*

| This document is printed in 18 point font size when unscaled and not numbered up. | This document is scaled. It is printed in 8 point font size and two-upped. |

*FIG. 5c*

| This document is printed in 18 point font size when unscaled and not numbered up. | This document is scaled. It is printed in 8 point font size and two-upped. |
| This document is printed in 18 point font size when unscaled and not numbered up. | This document is scaled. It is printed in 8 point font size and two-upped. |

*FIG. 5d*

IMPOSITION SYSTEMS, METHODS AND DRIVERS FOR PRINTER PRODUCTS

BACKGROUND

This disclosure relates to printing systems, methods and drivers and, more specifically, to the imposition of documents to control text size and, possibly, minimize waste of print media.

Written communication is conducted through, to a great extent, the use of printed or displayed text. Fonts define the shape and appearance of the characters, numerals, and punctuation that are used to represent languages having writing systems that are alphabetic or syllabic. Ever since the advent of writing, many different fonts have been developed, such as, for example, Ariel, Courier, Helvetica, Times New Roman, etc. In modern typography, such fonts are classified into a taxonomy that includes different font families such as Serif, Sans-Serif, Courier, Monospace, etc.

Fonts are defined by multiple characteristics, including size. A common system for specifying the size of fonts is the point system. In the point system, the size of a font is indicated by the length, in points, of the body size. As shown in FIG. 1, the body size of a font includes not only the "x-height", but also covers the height encompassed by the ascent, the full height of letters taller than an "x", and the descent, the additional height of letters that extend below the baseline. While many versions of the point system have been historically, and are currently, used, the common point system in use in the United States defines 72 points to equal 1 inch. Because different fonts have different appearances, text displayed in different fonts can have different readabilities to users even when the different fonts have the same font size.

In modern desktop printing systems, a document can be created or received In electronic form on a device such as a personal computer, a personal digital assistant, or other suitable device. Software can be utilized that can format the document, adjust the layout of the document, change fonts, change font sizes, etc. Thereafter, the document can be printed on a printer to produce a hardcopy of the document. The hardcopy of the document can further be bound or otherwise subjected to processing to result in a finished product. The fonts, printing resolution of the printing device, and the available recording medium used can, and do, vary between desktop publishing systems and depend on the software and hardware making up the system.

SUMMARY

Due to document design, variability in human eyesight, and appearance of the font used, many documents are not readable for all people. Systems and methods are described for automatically imposing a document or portion thereof in order to control font size to maintain readability and, optionally, minimize waste of paper and ink. When printing, some users make an educated gases as to the resulting readability of a document when they program job parameters. They may adjust number-up (number of pages per side of a sheet), scaling (reducing or enlarging), media size, etc. However, small fonts may become illegible for some readers and reprinting may be necessary.

According to aspects illustrated herein, there is provided methods, systems and drivers for preparing a document for printing that: (i) receive an electronic document to be printed, the document containing text having one or more font sizes; (ii) determine a smallest font size of the text of at least a portion of the document; (iii) determine a scale factor based on the smallest font size and a predetermined minimum font size, and (iv) scale at least the portion of the document by the scale factor.

According to aspects illustrated herein, there is further provided methods, systems and drivers for printing a document, that: (i) receive an electronic document to be printed, the document containing text having one or more font sizes; (ii) determine a smallest font size of the text of a first portion of the document; (iii) determine a scale factor based on the smallest font size and a predetermined minimum font size; (iv) scale at least the first portion of the document by the scale factor; and (v) print the document on a recording medium.

BRIEF DESCRIPTION OF THE DRAWINGS

FIGS. 5a-5d show examples of imposition.

DETAILED DESCRIPTION OF EMBODIMENTS

In some situations, there is a desire to print a document as compactly as possible, thereby avoiding waste of paper and ink. The lower-bound on how far a document can be shrunk typically is limited by the readability of the font used. Shrinking a document so that it is just readable creates a compact, low waste, representation of the document.

In other situations, a document's natural size when printed may have text that is too small for some readers. In this situation, it is desirable for the text to be expanded to a certain minimum size for legibility. Libraries carry large print editions of books for this reason. The upper bound on how large a document can be printed is limited, however, by the available recording medium and how many times, if any, a page of the document can be divided to span two or more sheets of recording media. The systems and methods described herein enable a person to have a large print edition of a book made to match the visual acuity of that person.

Figure 1:
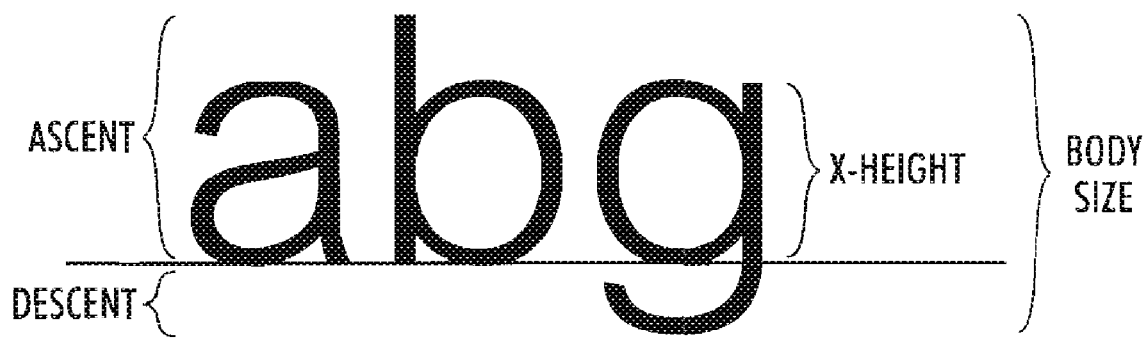
FIG. 1 shows selected characteristics of font characters.
Figure 2:
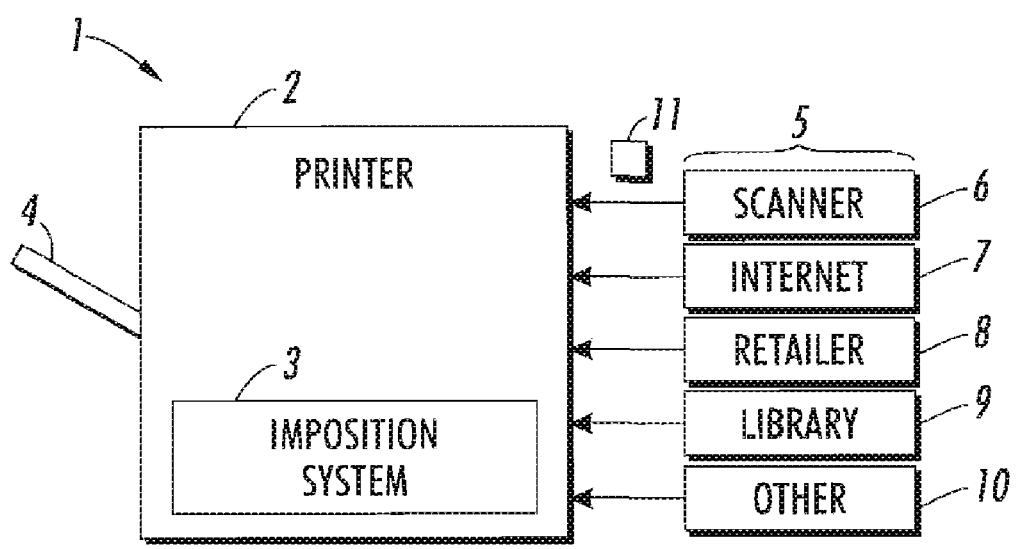
FIG. 2 shows one variation of a printing system.
Figure 3:
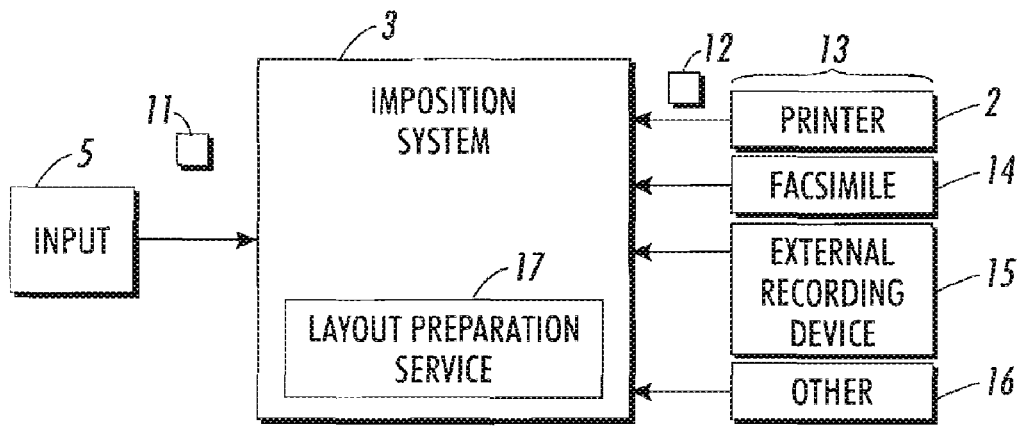
FIG. 3 shows another variation of a printing system.

FIG. 2 shows a printing system 1 which includes printer 2 having imposition system 3 and output destination 4. Input devices 5 include, for example, a scanner 6, the Internet 7, a retailer or store 8, a library 9, or any other device 10 capable of providing printer 2 with an electronic document 11. Printer 2 is shown as a stand-alone printer incorporating the imposition system 3, but the imposition system 3 can be separate from printer 2. For example, the imposition system 3 can be provided in a stand-alone electronic document repository as shown in FIG. 3, which receives an input document in electronic form from an input device such as one of the input devices 5. Alternatively, imposition system 3 could be part of an electronic document repository including one or more input devices 5. In variations, imposition system 3 is a printer driver residing in a printer such as printer 2 or in an electronic document repository such as, for example, a personal computer or a personal digital assistant.

In operation, input devices 5 provide imposition system 3 with an electronic document 11. Electronic document 11 can be any electronic document but generally at least a portion of electronic document 11 includes text. Further to this variation, the text portion of electronic document 11 can be described in a page description language such as portable document format (PDF), a format of Adobe Systems, Inc.; HP-PDF; postscript, another format of Adobe Systems, Inc.;

or the personal printer data stream (PPDS) format, for example. However, any other format able to represent an electronic document containing text can be used. Thereafter, as described in more detail in relation to FIG. 4, the imposition system 3 analyzes the electronic document 11 and, if needed, imposes a change in size, or scaling, of the document to control the font size(s) of the document. Imposition system 3 also can adjust, at this time, control job parameters for number-up, medium size, etc. to optimize the printing of the document (that is, to minimize usage of recording media). Thereafter, the document can be printed to output 4, and received by the user.

As used herein, "imposing" refers to the action of altering the parameters of a document so that the document prints in a desired manner, such as at a scaled size. As used herein, the term "number-up" refers to the printing of more than one page or image of a document on a single side of a recording medium. For example, "2-up" means that two page images are produced on one side of a single sheet of recording medium. As used herein, the term "tiling" refers to the printing of one page or image of a document on two or more sheets of recording media. For example, if the text needs to be increased in size, it may be necessary to print the page image on two or more sheets of recording media.

FIG. 3 shows an alternative in which imposition system 3 is stand-alone, receiving input electronic document 11 from an input device 5 and providing imposed output document 12 to any one or more of output devices 13 such as, for example, printer 2, facsimile machine 14, a document repository 15, or any other suitable output device 13 which can accept documents in electronic form that exists or is hereafter developed.

Figure 4:
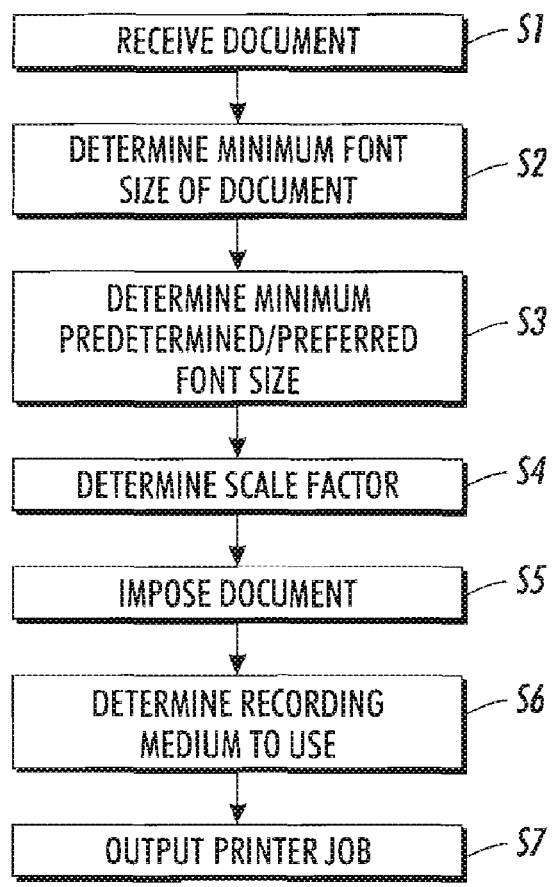
FIG. 4 shows a flowchart of a method of imposing a document.

FIG. 4 shows a flowchart of the operation of one variation of imposition system 3. The operation of imposition system 3 begins by receiving an electronic document 11 at step S1. Thereafter, at step S2, the electronic document 11 is analyzed by layout preparation service 17 or other text analysis method to determine the font size(s) used. The font, and font family for each font, if needed, also can be determined for each font used in the document. Thereafter, at step S3, layout preparation service 17 determines what imposition criteria are to be applied to the document. In this variation, layout preparation service 17 determines, at S3, a global minimum preferred (predetermined) font size.

In the simplest form of imposition, a global minimum font size is specified for the whole document, regardless of the font or font family used. This global minimum font size can be stored as a persistent system default that can be changed by authorized personnel such as a system administrator, as desired, for example. In alternative variations, each user of the imposition system 3 is able to specify the user's own global preferred (predetermined) minimum font size which is stored in a manner, for instance either in the print system or on a client workstation, that can be retrieved each time the user uses the imposition system 3. The predetermined minimum font size can be input to the system via a user interface including, for example, a screen display, keyboard and/or mouse. The system uses the display to query the user to input his/her minimum font size if no system default is prestored, the user can be queried to specify the global minimum font size, if the user desires. In addition to the global minimum font size, other parameters that can be globally set are the preferred recording medium, whether numbering up is to be used when possible (printing of two or more page images on one side of a sheet of the output medium), and, if numbering up is to be used, whether there is any limit on the amount of numbering up to be implemented. As with the global preferred font size, these other parameters can be implemented as system defaults, can be implemented as user preferences stored for use by users, and/or can be queried of a user in real time. With respect to prestored user preferences, the system can have a database in which each user's preferences are stored correlated to each user.

When only imposition of a global minimum font size is specified, the layout preparation service 17 compares the minimum detected font size from the document with the global minimum font size. If the global minimum font size is larger than the minimum font size of the document, the document must be scaled up so that the minimum font size of the document is greater than or equal to the global minimum font size.

In variations, the scale factor is determined by dividing the global preferred minimum font size by the minimum font size of the document to generate the font scale factor. In other variations, the scale factor can be rounded to the nearest integer or, to insure that all the fonts of the document equal or exceed the global preferred minimum font size, the next higher integer. This method can be used to scale the document font sizes up when the minimum document font size is less than the global minimum font size, or to scale the document font sizes down when the minimum document font size is larger than the global minimum font size. Scaling down the font size can be used when it is desired to save ink and/or recording media. In other variations, as desired, when waste of the recording medium or ink or the size of the printed document is not a concern, when the size of the recording medium is not yet known, or when the minimum size recording medium available is able to accommodate the electronic document as received, then the imposition system 3 may, optionally not scale the document down or number up the document.

In other variations, the imposition system 3 is able to analyze and impose portions or sections of the electronic document 11 independent of other portions. In these variations, at S2, the layout preparation service 17 analyzes each section or portion of the document to determine the minimum font size for each portion. Thereafter, at S4, the imposition system 3 independently determines the scale factor for each portion of the document as described above. Thus, each portion can be scaled up independently as required, or scaled down, if possible and if desired. Alternatively, only those portions having a font size smaller than the global preferred minimum font size are scaled up. Thereafter, at S5, each section or portion of the document is imposed with the scaling determined for that section or portion.

In variations the portions or sections of a document are chosen by the imposition system 3 such that each section or portion contains text that contiguously is of the same font and font size. Alternatively, each section or portion can be chosen to contain text that contiguously is of the same font family and font size. In other variations, each contiguous set of text having the minimum font size for the (document is placed in its own section or portion. In these variations, other sections could contain text having different fonts and font sizes, provided the font sizes of the text in those sections are larger than the minimum font size of the document. In still other variations, contiguous text having a font size equal to the maximum font size of the document also can be separated into separate sections or portions. By these measures, only those sections of a document most needing imposition can be imposed without causing problems with other text of the document not needing as much imposition.

An un-imposed document 11 is supplied to the imposition system. Imposition parameters are provided and/or derived by the layout preparation service 17 which will produce the optimal font sizes as described herein. These parameters, including number-up and scaling, describe how to size and position the images in the document. The imposition service uses the un-imposed input document and the provided parameters to create a new imposed document as output. The newly imposed document contains the same document content as the un-imposed document except that the content images are scaled up (enlarged) or down (reduced) and positioned on the pages appropriately. For instance, if the imposition parameters specify 2-up, each page and subsequent page (such as pages 1 & 2, then pages 3 & 4) in the un-imposed input document are reduced by half and placed side-by-side on one page in the imposed output document. Sheets that are specified to be folded together into, for example, a saddle stitched document, could have their pages imposed onto media that is double the size of the input document pages where no scaling occurs and images are placed side-by-side in a reader-order so that, after folding, the pages are read in order. An example of reader-order imposition is to place un-imposed document page 4 next to page 1 on the same imposed page, then page 2 next to page 3 on the following imposed page, duplex the output such that the resulting output can be read like a book when the sheet is folded in the center.

In other variations, in addition to, or alternatively to, a global preferred minimum font size, there are preferred minimum font family sizes specified for families of fonts. This is beneficial because, while different fonts of the same font size can vary widely in their readability for a user, generally different fonts within the same font family having the same font size will have less variation in readability. In these variations, at S2, the layout preparation service 17 determines not only the font sizes for each section of the document (or the document as a whole if the sections are not to be independently scaled), but also the font family of the font having the minimum font size in the document portion. Thereafter, instead of using a global preferred minimum font size, the imposition system 3 uses the global preferred minimum font family size for the corresponding font family.

When the target output device 13 is a device such as a printer 2 having different sizes of recording media, a facsimile machine 14, or an electronic document repository 15, such that the size of the printing medium is not an issue for the imposition system 3, then the determined change in font size can be imposed on the document at step S5 and the imposed electronic document 12 output at step S7. In variations, if the layout preparation service 17 also needs to ensure that the document is able to be printed on a target recording medium, such as when the layout preparation service 17 knows what recording medium will be used by a printer 2 to print the electronic document, the layout preparation service 17 also determines whether the recording medium has sufficient area to hold the imposed electronic document 12.

In these variations, a layout preparation service is used to determine imposition parameters that change how the document will look when printed. The layout preparation service 17 capability can be included within the imposition system 3. Alternatively, in other variations, the layout preparation service 17 can be an external service such as provided by additional software on the device implementing imposition system 3. Whether the layout preparation service 17 is internal to imposition system 3 or external, in summary the layout preparation service 17 can analyze and determine imposition values for, but not limited to font size for text of one or more portions of a document, and may determine imposition values for recording media size and document page size after scaling, for example. Further to these variations, system defined and/or user defined values for predetermined minimum font sizes, predetermined minimum font family font sizes can be defined as described above. Additionally, in variations, system defined and/or user defined values for minimum or maximum recording media sheet size may be defined. Alternatively or additionally, these values may be entered through the user interface at the time of imposition.

If a document's minimum font size is between greater than or equal to twice and less than four times larger than the preferred minimum font size, then the document can be imposed two-up (printed with two page images of the document on one side of one sheet of the recording medium). If a document's minimum font size is between greater than or equal to four times and less than eight times larger than the preferred minimum font size, then the document can be imposed four-up (printed with four page images of the document on one side of one sheet of the recording medium). In general, then, if a document's minimum font size is between greater than or equal to n-times and less than 2n-times larger than the preferred minimum font size, then the document can be imposed n-up (printed with n page images of the document on one side of one sheet of the recording medium).

If a document's minimum font size is smaller than the preferred minimum font size such that some or all of the document will be scaled up, then the layout preparation service 17 may choose a larger media size on which to print the document after scaling up the document. Alternatively (or in addition), the layout preparation service 17 can perform tiling on the document by which a page image of the document is split over two or more sheets of the output medium.

As an example, FIG. 5a shows an initial electronic document 11 having text of font size 18 points. If a user's global preferred minimum font size choice is 8 points, then the maximum font size scale factor is 8 divided by 18, or 0.44. In other words, the document can be scaled down such that text that would be printed at 18 point size is reduced to 8 point size. Thus, additionally, it may be possible to print multiple page images of the document on one side of one sheet of the recording medium, i.e. the document can be numbered up, thus saving recording media. As can be seen in FIG. 5b, one possible number up for the document, once scaled such that the text is 12 point, would be a number up of 2 whereby two page images of the scaled document are printed on one side of one recording medium sheet. FIG. 5c shows a number-up of two, after scaling the document such that the printed font size is 8 point instead of the original 18 point. However, in this case, scaling the document by a scale factor of 0.44 allows for the document to be printed four-up as shown in FIG. 5d, whereby four pages of the scaled document are printed on one side of one recording medium sheet. (In the two-up and four-up examples of FIGS. 5b -5d, the same page image is shown for simplicity and illustration. It is understood that different page images would be contained on the sheet. For example, pages 1 and 2 of the document could be contained on the sheet of FIGS. 5b and 5c, while pages 1-4 of the document could be contained on the sheet of FIG. 5d.)

Figure 6:
FIG. 6 shows another variation of a printing system.

As shown in FIG. 6, in other variations, the imposition system 3 can also control the layout of the final document. In these variations, use of recording medium 12 can be further reduced by restructuring the layout of the scaled document so as to compress the scaled document to as few output pages as possible. As shown in FIG. 6, the imposition system 3 receives an input document 11 at S10, layout preparation service 17 preflights the document at S11 and the layout preparation service 17 adjusts the scales of text of the document, determines number-up, and determines layout for the document at S12. This can include scaling portions of the document at different scale factors. Further to these variations, different portions of the document can be moved and rearranged relative to one another in order to, for example, conserve sheets of recording media by packing the document portions more efficiently. Once the layout preparation service 17 determines the scale factor(s) for the document or document portions, the best layout, etc. the document is imposed to meet these criteria at S13 and the document is output at S14. In other variations, the layout preparation service 17 can select an appropriate output medium.

When printing documents for distribution to audiences of multiple people, the imposition system 3, in variations, can retrieve the preferences of individual members of the audience in order to print documents tailored to the preferences of each audience member.

Additionally, the imposition system 3 can be available in a multifunction device, such as a device having two or more output devices 13, to allow users to implement their preferences of imposing document font size, minimizing document size, use of the output medium, or ink, etc. such as when scanning a document into electronic or hardcopy form, including scan-to-print, scan-to-fax, scan-to-email, or other such systems.

It will be appreciated that various of the above-disclosed and other features and functions, or alternatives thereof, may be desirably combined into many other different systems or applications. Also, various presently unforeseen or anticipated alternatives, modifications, variations or improvements therein may be subsequently made by those skilled in the art, and are also intended to be encompassed.

What is claimed is:

1. A method for preparing a document for printing, the method comprising:
   receiving an electronic document to be printed, the document containing text having one or more font sizes;
   determining a smallest font size of the text of at least a portion of the document;
   calculating imposition parameters including a scale factor based on the determined smallest font size and a predetermined minimum font size;
   imposing at least a portion of the document per the imposition parameters, the imposing including scaling based on the scale factor;
   storing the imposed document;
   determining a largest font size of the document;
   comparing the smallest font size of the document and the largest font size of the document to determine a font size span of the document; and
   if the font size span is greater than a predetermined maximum font span, the predetermined maximum font span being a difference between the predetermined minimum font size and a predetermined maximum font size:
      dividing the document into two or more portions such that text having the smallest font size is in a first portion and text having the largest font size is in a second portion;
      independently determining scale factors for each of the two or more portions; and
      independently scaling the two or more portions according to the corresponding scale factors.

2. The method of claim 1, wherein the step of calculating imposition parameters comprises:
   determining a minimum text font size able to be printed that is larger than the predetermined minimum font size; and
   calculating the scale factor to be equal to the determined smallest font size divided into the determined minimum text font size.

3. The method of claim 1, wherein the step of calculating imposition parameters comprises:
   determining a minimum text font size able to be printed that is larger than the predetermined minimum font size;
   calculating a quotient that is equal to the determined smallest font size divided into the determined minimum text font size;
   determining the scale factor to be a smallest integer greater than, or equal to, the quotient; and
   determining imposition parameters for placing two or more images onto a single recording medium sheet.

4. The method of claim 1, wherein the predetermined minimum font size is user specific such that each different user can have a different predetermined minimum font size.

5. The method of claim 1, wherein if the determined scale factor is less than 1, setting the scale factor to 1.

6. The method of claim 1, further comprising:
   determining a recording medium size on which the imposed document can be printed without tiling any portion of the document; and
   selecting the determined recording medium for printing the imposed document.

7. The method of claim 1, further comprising:
   if no recording medium size is available on which the imposed document can be printed without tiling:
      determining one or more portions of the imposed document that require tiling, and
      tiling the one or more portions of the scaled document so that one or more portions of the scaled document are printed as two or more pages.

8. The method of claim 1, further comprising:
   determining a font-type of at least a portion of the document; and
   determining the font family of the font-type,
   wherein the step of determining a scale factor uses a predetermined minimum font size specified for the determined font family, and, if no predetermined minimum font size is specified for the determined font family, a default predetermined minimum font size is used.

9. A method for printing a document, the method comprising:
   receiving an electronic document to be printed, the document containing text having one or more font sizes;
   determining a smallest font size of the text of a first portion of the document;
   calculating imposition parameters including a scale factor based on the determined smallest font size and a predetermined minimum font size;
   imposing at least the first portion of the document according to the imposition parameters, the imposing including scaling based on the scale factor;
   printing the document on a recording medium after the step of imposing;
   determining a largest font size of the document;
   comparing the smallest font size of the document and the largest font size of the document to determine a font size span of the document; and
   if the font size span is greater than a predetermined maximum font span, the predetermined maximum font span being a difference between the predetermined minimum font size and a predetermined maximum font size:
      dividing the document into two or more portions such that text having the smallest font size is in a first portion and text having the largest font size is in a second portion;
      independently determining scale factors for each of the two or more portions; and independently scaling the two or more portions according to the corresponding scale factors.

10. The method of claim 9, wherein the step of determining the imposition parameter for scale factor includes dividing the predetermined minimum font size by the smallest font size.

11. The method of claim 9, further comprising the step of:
selecting a recording medium size having the minimum recording area able to accommodate at least the scaled first portion of the document without changing pagination of the document.

12. The method of claim 9, further comprising:
selecting a recording medium size to use in printing the scaled document;
determining a maximum page size of the scaled portion of the document;
comparing an area of the selected recording medium size and the determined maximum page size; and
if two or more page images of the scaled portion of the document can be printed on one sheet of the recording medium size, imposing a number up of at least the scaled portion of the document,
wherein two or more page images of at least the scaled portion of the document are printed on a single side of a single sheet of the selected recording medium size resulting in a reduction of the number of recording medium sheets used to print the scaled document.

13. The method of claim 9, further comprising:
determining a maximum page size of at least a second portion of the scaled document;
comparing the maximum page size with a page size of the recording medium; and
if the page size of the recording medium can accommodate two or more page images having the maximum page size, imposing a number up on the document, wherein
the document is printed with two or more page images on one side of one sheet of the recording medium.

14. A system for preparing a document for printing, the system comprising a processor that:
determines a minimum font size of text contained in at least a portion of the document;
determines a scale factor from the determined minimum font size and a predetermined minimum font size;
uses the scale factor to scale the at least a portion of the document, wherein font sizes of text in the document, when printed, are equal to, or greater than, the predetermined minimum font size;
determines a largest font size of the document;
comparing the minimum font size of the document and the largest font size of the document to determine a font size span of the document; and
if the font size span is greater than a predetermined maximum font span, the predetermined maximum font span being a difference between the predetermined minimum font size and a predetermined maximum font size:
divides the document into two or more portions such that text having the minimum font size is in a first portion and text having the largest font size is in a second portion;
independently determines scale factors for each of the two or more portions; and
independently scales the two or more portions according to the corresponding scale factors.

15. The system of claim 14, wherein the processor further determines a font family for the text contained in the at least a portion of the document, wherein the predetermined minimum font size is a predetermined minimum font family font size corresponding to the determined font family.

16. The system of claim 14, wherein the processor further:
determines a number-up value for the at least a portion of the document; and
imposes a number-up on the at least a portion of the document, wherein
when the at least a portion of the document is printed, each sheet of the recording medium contains a number of pages of the at least a portion of the document equal to the number-up value.

17. The system of claim 16, wherein the processor further:
determines a size that at least a portion of the document will have when printed.

18. The system of claim 16, further comprising:
a memory that stores predetermined minimum font sizes associated with user identifications, wherein
the predetermined minimum font size used by the processor to determine the scale factor corresponds to a user for whom the document to be imposed was input.

* * * * *